United States Patent [19]

Ono

[11] 3,943,698

[45] Mar. 16, 1976

[54] ROTOR FOR ELECTRONIC WRISTWATCH STEP MOTOR

[75] Inventor: Yoshikazu Ono, Suwa, Japan

[73] Assignee: Kabushiki Kaisha Suwa Seikosha, Tokyo, Japan

[22] Filed: Dec. 9, 1974

[21] Appl. No.: 531,009

[30] Foreign Application Priority Data

Dec. 10, 1973 Japan .............................. 48-137545

[52] U.S. Cl. .................................. 58/23 D; 310/156

[51] Int. Cl.[2] ...................... G04C 3/00; H02K 21/12

[58] Field of Search ....... 58/23 D; 310/49, 152, 156

[56] References Cited

UNITED STATES PATENTS

| | | | |
|---|---|---|---|
| 3,007,067 | 10/1961 | Snyder | 310/156 X |
| 3,473,061 | 10/1969 | Soehner et al. | 310/156 |
| 3,858,308 | 1/1975 | Peterson | 310/156 X |

FOREIGN PATENTS OR APPLICATIONS

| | | | |
|---|---|---|---|
| 264,379 | 8/1968 | Austria | 58/23 D |

*Primary Examiner*—George H. Miller, Jr.
*Attorney, Agent, or Firm*—Blum, Moscovitz, Friedman & Kaplan

[57] ABSTRACT

A high performance rotor for an electronic wristwatch step motor and method of forming same is provided. A rotor pinion has a high performance permanent magnet rotor mounted thereto. The permanent magnet rotor includes a brittle permanent magnet core, and a reinforcing plate, the combination of the permanent magnet core and reinforcing plate allowing the high performance magnetic rotor to be interference fit upon the rotor pinion to effect an improved rotor construction.

9 Claims, 2 Drawing Figures

ROTOR FOR ELECTRONIC WRISTWATCH STEP MOTOR

BACKGROUND OF THE INVENTION

This invention is directed to a rotor construction for an electronic wristwatch step motor, and in particular to a rotor construction including a high performance brittle permanent magnet core, and method of forming a rotor construction including same.

Electronic wristwatches incorporating quartz crystal vibrators as a time standard have yielded wristwatches having accuracies heretofore unobtainable in mechanical movement wristwatches. Such wristwatches include a quartz crystal ocillator circuit for producing an oscillating signal in a response to the vibration of the quartz crystal vibrator. A divider circuit including a plurality of divider stages in response to the high frequency oscillating signal produced by the oscillator circuit produces a very accurate low frequency drive signal. A step motor includes a rotor having the torque thereof determined by the timing drive signals produced by the divider circuit and applied to the step motor. The rotor is rotationally coupled to a gear train assembly which assembly is mechanically coupled to the hands for displaying time. Accordingly, the rotational motion of the rotor is transmitted to the geared hands to effect time display.

One requirement of the step motor, and in particular the rotor construction thereof is that the size be limited in order to make same particularly suitable for use in a small sized wristwatch. Nevertheless, in order to effect the accurate translation of the rotational motion to the hands in response to the extremely accurate electronic signals supplied to the step motor, the rotor assembly must be formed of a high performance magnet and have good mechanical strength.

Heretofore, the use of permanent magnets such as Pt-Co magnets have been utilized in the rotor constructions of wristwatch step motors. Although such permanent magnets were expensive to manufacture, their popularity has been based on the facility with which same can be machined and the relatively good performance thereof.

Nevertheless, high performance permanent magnets such as samarium-cobalt or barium ferrite which are capable of being fabricated at minimum cost have been utilized in permanent magnet rotors of the type discussed above, because same are extremely brittle and therefore cannot be machined in the same manner as the considerably lower performance magnets discussed above. For example, the use of such high performance brittle permanent magnet materials in a rotor construction have required cutting by use of a grindstone, abrasion processing, and the caulking of the rotor construction to the rotor pinion in order to manufacture a rotor construction having a very high performance permanent magnet. The cutting and abrasion processes require considerable time to obtain the necessary accuracy. Moreover, the caulking of the permanent magnet to the rotor pinion shaft has proved less than completely satisfactory in view of the eccentricity caused by the gap between the shaft and the permanent magnet when same are adhered, and the cracking of the permanent magnet which occurs when the permanent magnet is secured to the shaft. Accordingly, a rotor construction utilizing a brittle high performance permanent magnet, and a method for forming same is desired.

SUMMARY OF THE INVENTION

Generally speaking, in accordance with the invention, an improved rotor construction for an electronic wristwatch step motor is provided. The rotor construction includes a rotor pinion and a high performance permanent magnet rotor mounted thereto. The permanent magnet rotor includes a brittle permanent magnet core and a reinforcing plate. The permanent magnet core and reinforcing plate are securely engaged to the rotor pinion to define an improved rotor construction. Additionally, a bush can be utilized to improve the securing of the high performance permanent magnet rotor to the rotor pinion.

Accordingly, it is an object of the invention to provide an improved rotor construction for an electronic wristwatch step motor and an improved method for forming same.

Another object of this invention is to utilize high performance brittle permanent magnets in small sized step motor rotor constructions.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
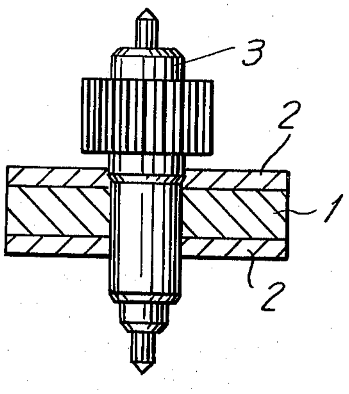
FIG. 1 is a sectional view of a rotor construction in accordance with a preferred embodiment of the instant invention.

Reference is now made to FIG. 1 wherein a high performance rotor construction is depicted. A high performance brittle permanent magnet core formed of samarium-cobalt is sandwiched between stainless steel reinforcing plates 2. The permanent magnet core 1 and reinforcing plates 2 are secured to a rotor pinion formed of hardened carbon steel. As discussed below, because of the manner in which the permanent magnet 1 and reinforcing plates 2 are formed and secured together, cracks occurring at the time that the permanent magnet is secured to the rotor pinion are thereby avoided.

In a preferred method of making the rotor construction depicted in FIG. 1, a samarium cobalt or barium ferrite permanent magnet is punched into a core having a 2mm outer diameter, 0.8mm inner diameter, and a 0.5mm thickness. Thereafter, stainless steel plates having 0.1mm thickness are secured by resin bonding and well known pressing techniques to sandwich therebetween the permanent magnet core. Thereafter, the permanent and reinforcing plates are interference fit on the rotor pinion, the reinforcing plates preventing the permanent magnet rotor from cracking. It is noted, that by utilizing the above described method, a rotor construction can be manufactured wherein the outer periphery portion of the permanent magnet has an eccentricity error of considerably less than 0.10mm. Moreover, such manufacturing methods reduce the cost for forming such a rotor construction to one tenth the cost required to form Pt-Co magnet rotor constructions.

Figure 2:
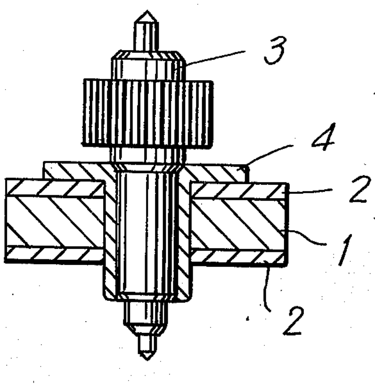
FIG. 2 is a sectional view of another rotor construction in accordance with an alternate embodiment of the instant invention.

Reference is now made to FIG. 2 wherein a rotor construction in accordance with an alternate embodiment is depicted, like reference numerals being utilized to denote like elements depicted in FIG. 1. In order to reduce the fitting stress between the rotor pinion 3 and permanent magnet core 1, a bush 4 formed of brass is disposed intermediate the permanent magnet rotor and the rotor pinion 3. Accordingly, the bush further reinforces the rotor construction.

In accordance with the embodiment depicted above, a rotor construction utilizing a rare earth cobalt group brittle permanent magnet such as samarium cobalt is effected. The benefits which inure to such a rotor construction render same particularly suitable for use in an electronic wristwatch step motor wherein the accuracy of the step motor must correspond to the accuracy achieved by the electronic circuitry producing the signals for driving same. Moreover, such a rotor construction can be performed at an extremely low cost.

It is further noted that the rotor construction disclosed herein although particularly suited for use in an electronic wristwatch step motor is not limited thereto, but is particularly useful in other kinds of compact precision rotors. Additionally, the supporting plates utilized to reinforce the brittle permanent magnet core are not limited to stainless steel and further include brass or plastic sheeting for effecting an improved rotor construction.

It will thus be seen that the objects set forth above, among those made apparent from the preceding description, are efficiently attained and, since certain changes may be made in carrying out the above method and in constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A rotor construction for an electronic wristwatch step motor comprising a rotor pinion and a high performance permanent magnet rotor mounted thereto, said permanent magnet rotor including a brittle permanent magnet core defining at least two diametrically opposite polarity poles and a nonmagnetizable reinforcing plate.

2. A rotor construction as claimed in claim 1 wherein said permanent magnet rotor includes a bush between same and said rotor pinion.

3. A rotor construction as claimed in claim 1 wherein said reinforcing plate is comprised of one of the group of stainless steel, brass and plastic.

4. A rotor construction as claimed in claim 1 wherein said brittle permanent magnet is formed of barium ferrite.

5. A rotor construction as claimed in claim 1 wherein said brittle permanent magnet core is formed of samarium cobalt.

6. A rotor construction as claimed in claim 5 wherein said reinforcing plate is formed of one of the group that comprise stainless steel, plastic and brass.

7. A rotor construction as claimed in claim 1 wherein said permanent magnet rotor includes an additional non-magnetizable reinforcing plate, said reinforcing plates sandwiching said brittle permanent magnet.

8. A rotor construction as claimed in claim 7 wherein said permanent magnet rotor includes a bush between same and said rotor pinion.

9. A rotor construction as claimed in claim 7 wherein the reinforcing plates are comprised of one of the group of stainless steel, brass and plastic.

* * * * *